(12) United States Patent
Jain et al.

(10) Patent No.: US 10,044,478 B2
(45) Date of Patent: Aug. 7, 2018

(54) PSEUDO RANDOMIZATION OF UNUSED RESOURCES AT A MEDIUM ACCESS CONTROL (MAC) LAYER

(71) Applicant: QUALCOMM Incorporated, San Diego, CA (US)

(72) Inventors: Amit Gopilal Jain, San Diego, CA (US); Emilija Milorad Simic, La Jolla, CA (US); Bao Vinh Nguyen, San Diego, CA (US); Dominic Gerard Farmer, Los Gatos, CA (US); Arif Ehsan, San Diego, CA (US); Dinesh Subramani, San Diego, CA (US); Duong Anh Hoang, San Diego, CA (US); Timothy Paul Pals, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 14/795,718

(22) Filed: Jul. 9, 2015

(65) Prior Publication Data

US 2016/0014806 A1    Jan. 14, 2016

Related U.S. Application Data

(60) Provisional application No. 62/024,338, filed on Jul. 14, 2014.

(51) Int. Cl.
*H04L 5/00* (2006.01)
*G06F 7/58* (2006.01)
(Continued)

(52) U.S. Cl.
CPC ............ *H04L 5/0048* (2013.01); *G06F 7/584* (2013.01); *H04B 7/00* (2013.01); *H04L 5/0001* (2013.01);
(Continued)

(58) Field of Classification Search
None
See application file for complete search history.

(56) References Cited

U.S. PATENT DOCUMENTS 7,519,823 B1 * 4/2009 Schumacher ........... G06F 21/16
380/268
7,903,818 B2 * 3/2011 Park .................... H04W 74/002
370/335

(Continued)

FOREIGN PATENT DOCUMENTS

| EP | 2 408 115 A2 | 1/2012 |
| WO | WO-2010/018509 A2 | 2/2010 |
| WO | WO-2012/112861 A1 | 8/2012 |

OTHER PUBLICATIONS

Baghel S.K., et al., "Coexistence Possibilities of LTE with ISM Technologies and GNSS," IEEE, 2011 International Conference on Communications, Jan. 28-30, 2011. p. 1-5.

(Continued)

*Primary Examiner* — Suk Jin Kang
(74) *Attorney, Agent, or Firm* — Arent Fox, LLP and Qualcomm Incorporated

(57) ABSTRACT

The present disclosure relates to pseudo-randomization of unused resources at a medium access control layer (MAC) of a user equipment (UE). For example, the disclosure presents a method and an apparatus for determining that an uplink (UL) resource grant, associated with a first radio access technology (RAT), for the UE results in unused resources where there are a greater number of resources than available data for transmission at the UE, wherein the UE is configured to receive information associated with a second RAT, and wherein the first RAT is different from the second RAT, populating the unused resources, at a medium access control (MAC) layer, with pseudo-randomized bits, and transmitting at least a portion of the available data and the (Continued)

populated unused resources using the UL resource grant associated with the first RAT. As such, pseudo-randomization of unused resources at a medium access control layer (MAC) of a UE may be achieved.

24 Claims, 12 Drawing Sheets

(51) Int. Cl.
　　*H04B 7/00*　　　(2006.01)
　　*H04W 72/00*　　(2009.01)
　　*H04L 27/34*　　　(2006.01)
(52) U.S. Cl.
　　CPC ........... *H04L 5/0053* (2013.01); *H04W 72/00* (2013.01); *H04L 27/34* (2013.01)

(56) References Cited

U.S. PATENT DOCUMENTS

| | | | |
|---|---|---|---|
| 8,891,436 B2 | 11/2014 | Zhang et al. | |
| 2002/0191533 A1 | 12/2002 | Chini et al. | |
| 2003/0174675 A1* | 9/2003 | Willenegger | H04B 7/022 370/335 |
| 2003/0174686 A1* | 9/2003 | Willenegger | H04L 1/0071 370/342 |
| 2008/0025264 A1* | 1/2008 | Willenegger | H04B 7/022 370/333 |
| 2009/0168715 A1* | 7/2009 | Cai | H04W 72/02 370/329 |
| 2010/0008230 A1* | 1/2010 | Khandekar | H04W 16/10 370/237 |
| 2011/0039568 A1* | 2/2011 | Zhang | H04W 52/50 455/452.1 |
| 2011/0044218 A1* | 2/2011 | Kaur | H04W 76/026 370/310 |
| 2011/0151883 A1* | 6/2011 | Bossard | H04L 1/0067 455/450 |
| 2011/0274059 A1* | 11/2011 | Brown | H04L 27/0008 370/329 |
| 2012/0009887 A1* | 1/2012 | Sanguinetti | H04B 1/18 455/78 |
| 2012/0213162 A1* | 8/2012 | Koo | H04W 16/14 370/329 |
| 2014/0003805 A1* | 1/2014 | Singh | H04W 24/06 398/16 |
| 2014/0024388 A1* | 1/2014 | Earnshaw | H04L 5/0073 455/452.2 |
| 2014/0036808 A1* | 2/2014 | Pelletier | H04W 72/14 370/329 |
| 2014/0079215 A1 | 3/2014 | Wei et al. | |
| 2014/0112264 A1 | 4/2014 | Bao et al. | |
| 2014/0129824 A1 | 5/2014 | Paris et al. | |
| 2014/0198766 A1* | 7/2014 | Siomina | H04W 72/082 370/330 |
| 2014/0287771 A1* | 9/2014 | Koo | H04W 16/14 455/452.1 |
| 2015/0036637 A1* | 2/2015 | Nayeb Nazar | H04L 1/1812 370/329 |
| 2015/0052586 A1 | 2/2015 | Mills | |
| 2015/0110036 A1* | 4/2015 | Zhang | H04W 72/085 370/329 |
| 2016/0028533 A1* | 1/2016 | Kazmi | H04W 72/1278 370/296 |
| 2016/0050678 A1* | 2/2016 | Sherman | H04W 72/082 370/329 |
| 2016/0105905 A1* | 4/2016 | Vajapeyam | H04W 72/1263 370/330 |
| 2016/0174213 A1* | 6/2016 | Webb | H04L 5/0051 370/336 |
| 2016/0183309 A1* | 6/2016 | Zhang | H04W 52/50 370/329 |
| 2016/0269137 A1* | 9/2016 | Lindoff | H04W 72/082 |
| 2017/0078890 A1* | 3/2017 | Zhu | H04W 16/14 |
| 2017/0208601 A1* | 7/2017 | Zhang | H04W 72/085 |

OTHER PUBLICATIONS

International Search Report and Written Opinion—PCT/US2015/039955—ISA/EPO—dated Oct. 14, 2015. (11 total pages).

* cited by examiner

PSEUDO RANDOMIZATION OF UNUSED RESOURCES AT A MEDIUM ACCESS CONTROL (MAC) LAYER

CLAIM OF PRIORITY

The present application for patent claims priority to U.S. Provisional Patent Application No. 62/024,338, filed Jul. 14, 2014, entitled "Pseudo Randomization Mechanism for Padding at a Medium Access Control (MAC) Layer," which is assigned to the assignee hereof, and hereby expressly incorporated by reference herein.

BACKGROUND

The present disclosure relates generally to communication systems, and more particularly, to procedures at a media access control (MAC) layer of a user equipment (UE) for data transmission on an uplink (UL).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In some wireless communication networks, the harmonics or high order product of harmonics of a cellular uplink may fall into a global navigation satellite system (GNSS) receive band and degrade GNSS sensitivity which may result in GNSS receiver detecting false satellite vehicles (SVs). Additionally, when cellular and GNSS receivers co-exist at the UE, the UE may transmit padding bits, which includes a string of zeroes, on the cellular uplink that may create additional multi-tone jammer at the GNSS receiver which may result in a GNSS position outlier.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents an example method and apparatus for wireless communications at a UE. For example, the present disclosure presents an example method for wireless communications that may include determining that an uplink (UL) resource grant, associated with a first radio access technology (RAT), for the UE results in unused resources where there are a greater number of resources than available data for transmission at the UE, wherein the UE is configured to receive information associated with a second RAT, and wherein the first RAT is different from the second RAT, populating the unused resources, at a medium access control (MAC) layer, with pseudo-randomized bits, and transmitting at least a portion of the available data and the populated unused resources using the UL resource grant associated with the first RAT.

Further, the present disclosure provides an apparatus for wireless communications at a UE that may include means for determining that an uplink (UL) resource grant, associated with a first radio access technology (RAT), for the UE results in unused resources where there are a greater number of resources than available data for transmission at the UE, wherein the UE is configured to receive information associated with a second RAT, and wherein the first RAT is different from the second RAT, means for populating the unused resources, at a medium access control (MAC) layer, with pseudo-randomized bits, and means for transmitting at least a portion of the available data and the populated unused resources using the UL resource grant associated with the first RAT.

Furthermore, the present disclosure provides a non-transitory computer-readable medium storing computer executable code for wireless communications that may include code for determining that an uplink (UL) resource grant, associated with a first radio access technology (RAT), for the UE results in unused resources where there are a greater number of resources than available data for transmission at the UE, wherein the UE is configured to receive information associated with a second RAT, and wherein the first RAT is different from the second RAT, code for populating the unused resources, at a medium access control (MAC) layer, with pseudo-randomized bits, and code for transmitting at least a portion of the available data and the populated unused resources using the UL resource grant associated with the first RAT.

Additionally, the present disclosure provides an apparatus for wireless communications that may include a resource determining component configured to determine that an uplink (UL) resource grant, associated with a first radio access technology (RAT), for the UE results in unused resources where there are a greater number of resources than available data for transmission at the UE, wherein the UE is configured to receive information associated with a second RAT, and wherein the first RAT is different from the second RAT, a populating component configured to populate the unused resources, at a medium access control (MAC) layer, with pseudo-randomized bits, and a transmitting component configured to transmit at least a portion of the available data and the populated unused resources using the UL resource grant associated with the first RAT.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
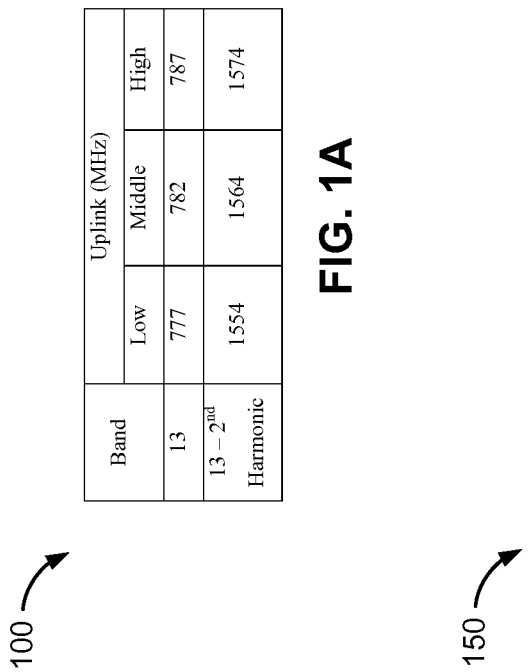
FIGS. 1A-1B illustrate an example configuration of frequencies in LTE and GNSS systems.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1A illustrates frequency details of an example LTE Band 13 uplink. For example, the frequency range of the first harmonic of LTE Band 13 uplink is 777 MHz-787 MHz with low, middle and high frequencies of 777, 782, and 787 MHz. The high frequency of the second harmonic of LTE band 13 is 1574 MHz. The frequency range of the second harmonic is calculated by multiplying the frequency range of the first harmonic by a factor of two (e.g., 2×777; 2×787) as described in reference to FIG. 2 below.

FIG. 1B illustrates an example center frequency of GNSS L1 band. For example, the center frequency of the first harmonic of GNSS L1 band is 1575.42 MHz. As illustrated in FIGS. 1A and 1B, the frequency of the second harmonic of LTE band 13 UL (1574 MHz) is closer to the frequency of GNSS L1 band resulting in interference at the UE which may affect the communications at UE 202 (e.g., GNSS communications).

Figure 2:
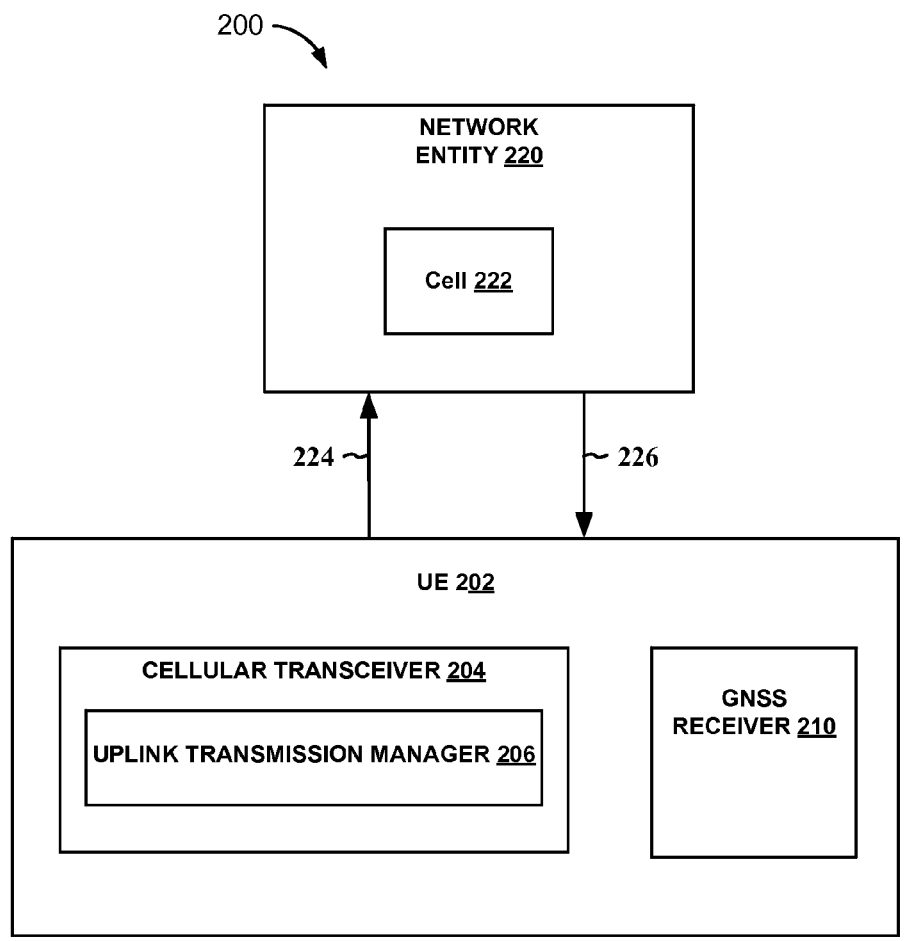
FIG. 2 is a block diagram illustrating an example wireless system in aspects of the present disclosure.

Referring to FIG. 2, a wireless communication system 200 is illustrated that facilitates wireless communications at user equipment (UE). For example, wireless communication system 200 includes UE 202 that may communicate with a network entity 220 via one or more over-the-air links, 224 and/or 226. In an aspect, network entity 220 may include one or more cells 222 for supporting communications with UE 202. In an aspect, for example, link 224 may be configured as an uplink (UL) for supporting communications from UE 202 to network entity 220 and/or cell 222, and link 226 may be configured as a downlink (DL) for supporting communications from network entity 220 and/or cell 222 to UE 202.

In an aspect, for example, UE 202 may include a cellular transceiver 204 for supporting cellular communications with network entity 220 and/or cell 222 and may also include a global navigation satellite system (GNSS) receiver 210 for supporting location based services (e.g., E911, navigation system, etc.). In an additional or optional aspect, cellular transceiver 204 and GNSS receiver 210 may co-exist (e.g., co-located at UE 202). In a further additional aspect, UE 202 may operate on any of the radio access technology (RAT) standards as defined by 3GPP Specifications (e.g., LTE, W-CDMA, GNSS, etc.).

In an example aspect, UE 202 and/or cellular transceiver 204 may be configured to operate on long term evolution (LTE) RAT standard. For example, UE 202 and/or cellular transceiver 204 may be configured to operate in LTE Band 13 with UL frequencies of 777 MHz (low), 782 MHz (middle), and 787 MHz (high), and/or GNSS receiver 210 may be configured to operate in global positioning system (GPS) L1 band with a center frequency of 1515.42 MHz.

In an aspect, for example, when UE 202 is operating in LTE Band 13, the second harmonic of UL 224 computed by multiplying the frequency of the LTE Band 13 UL by a factor of two is close to the frequency of GPS L1 band. This may result in degradation of GNSS receiver 210 sensitivity. That is, the frequency of the second harmonic of LTE Band, 1574 MHz (e.g., 2×787 MHz=1574 MHz) is closer to 1575.42 MHz, frequency of GNSS L1 band (on the receiving side). The degradation in GNSS receiver 210 sensitivity may result in false alarms at GNSS receiver. For example, in an aspect, a false alarm at GNSS receiver 210 may be in the form of GNSS receiver 210 detecting a false satellite vehicle (SV). That is, the interference from data transmitted from cellular transceiver 204 on UL 224 in LTE band 13 may be falsely identified or interpreted by GNSS receiver 210 as data coming from a satellite vehicle (SV).

In an additional aspect, a false alarm at GNSS receiver 210 may be predominantly observed in situations where UE 202 is granted greater number of resources (or resource blocks, RBs) than the resources required (or needed) for data available for transmission at the UE. That is, a false alarm at GNSS receiver 210 may be predominantly observed in situations where there are a greater number of resources than available data for transmission at the UE.

For example, in an aspect, UE 202 may need six RBs for transmitting the data available at UE 202 on the UL. However, if the UE is granted greater number of resources than available data for transmission at the UE, e.g., 12 RBs, media access control (MAC) layer of UE 202 may populate the unused resources at the MAC layer with pseudo-randomized bits which may included all zeroes as defined in 3GPP Specifications (e.g., Evolved Universal Terrestrial Radio Access (E-UTRA) Medium Access Control (MAC) protocol specification, TS 36.321).

However, when cellular transceiver 204 and GNSS receiver 210 co-exist (or co-locate) at UE 202, periodic transmission of all zeroes on UL 224 from cellular transceiver 204 related to the populating of the unused resources may create a multi-tone jammer at GNSS receiver 210 resulting in a false SV detection at GNSS receiver 210 and/or a position outlier, e.g., wrong position information at GNSS receiver 210. This may cause significant issues if the position information computed by GNSS receiver 210 is used or relied on by other applications, e.g., E911, navigation systems, etc. Additionally, the impact related to computing position information becomes much more relevant for data signal transmissions (vs pilot signal transmission) as the data signal is transmitted at a much higher power level (e.g., pilot signal is transmitted at about 1/10th the power of the data signal on the UL).

In an aspect, network entity 220 may include one or more of any type of network components, for example, an access point, including a base station (BS) or Node B or eNodeB or a femto cell, a relay, a peer-to-peer device, an authentication, authorization and accounting (AAA) server, a mobile switching center (MSC), a radio network controller (RNC), etc., that can enable UE 202 to communicate and/or establish and maintain links 224 and/or 226 to respectively communicate with network entity 220.

In an additional aspect, UE 202 may be a mobile apparatus and may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

In an aspect, UE 202 and/or uplink transmission manager 206 may determine that an uplink (UL) resource grant, associated with a first radio access technology (RAT), for the UE results in unused resources where there are a greater number of resources than available data for transmission at the UE, wherein the UE is configured to receive information associated with a second RAT, and wherein the first RAT is different from the second RAT, populate the unused resources, at a medium access control (MAC) layer, with pseudo-randomized bits, and transmit at least a portion of the available data and the populated unused resources using the UL resource grant associated with the first RAT.

In an additional or optional aspect, UE 202 and/or uplink transmission manager 202 may populate the unused resources by generating a maximum length sequence (MLS) and storing the MLS in a first buffer at the MAC layer, performing a bit inversion of the MLS and storing an output of the bit inversion in a second buffer at the MAC layer, initiating a linear feedback shift register (LFSR) with a non-zero value at the MAC layer, and copying contents of the first buffer to a MAC transmit buffer when a value of a least significant bit (LSB) of the LFSR is zero. In a further additional or optional aspect, UE 202 and/or uplink transmission manager 202 may copying contents of the second buffer to the MAC transmit buffer when the value of the LSB of the LFSR is one.

Figure 3:
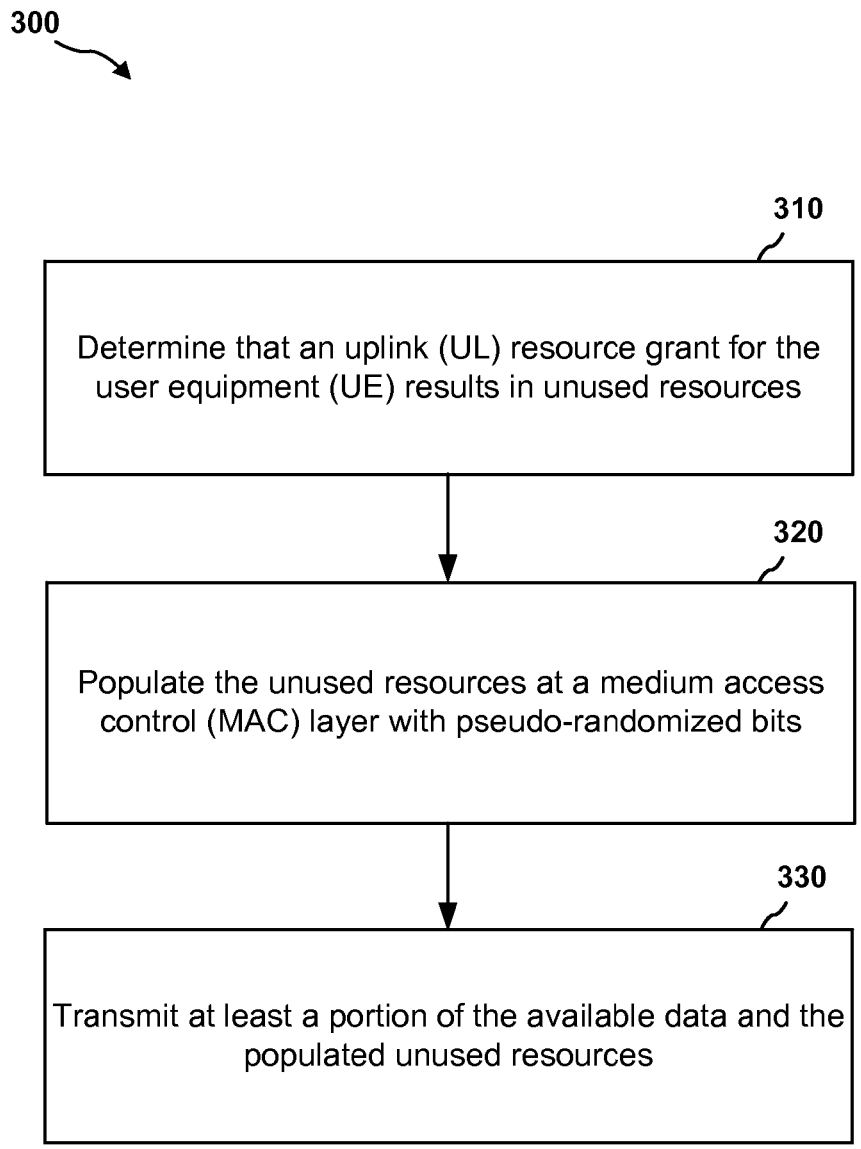
FIG. 3 is a flow diagram illustrating aspects of an example method in aspects of the present disclosure.

FIG. 3 illustrates an example methodology 300 for wireless communications at a user equipment (UE).

The methods are shown and described as a series of acts for purposes of simplicity of explanation. However, it is to be understood and appreciated that the methods (and further methods related thereto) are not limited by the order of acts, as some acts may, in accordance with one or more aspects, occur in different orders and/or concurrently with other acts from that shown and described herein. For example, it is to be appreciated that the methods may alternatively be represented as a series of interrelated states or events, such as in a state diagram. Moreover, not all illustrated acts may be required to implement a method in accordance with one or more features described herein.

In an aspect, at block 310, methodology 300 may include determining that an uplink (UL) resource grant, associated with a first radio access technology (RAT), for the UE results in unused resources where there are a greater number of resources than available data for transmission at the UE, wherein the UE is configured to receive information associated with a second RAT. For example, in an aspect, UE 202 and/or uplink transmission manager 206 may include a specially programmed processor module, or a processor executing specially programmed code stored in a memory, to determine that an uplink (UL) resource grant, associated with a first radio access technology (RAT), for UE 202 results in unused resources where there are a greater number of resources than available data for transmission at UE 202, wherein UE 202 is configured to receive information associated with a second RAT.

In an aspect, network entity 220 and/or cell 222 may grant resources (e.g., resource grants, resource blocks, etc.) to UE 202 for transmitting data on UL 224 from UE 202 to cell 222. However, UE 202 may be granted a greater (or higher) number of resources than available data for transmission (that is, number of resources granted to UE 202 is greater than the number of resources needed for transmitting the data available at UE 202) in transmit buffers of UE 202. For example, UE 202 may need only 6 resource blocks (RBs) for transmitting data available at UE 202 on UL 224 to network entity 220 and/or cell 222 and the UE may be granted 12 RBs. For instance, in an aspect, the resource grant may be associated with a first RAT (e.g, LTE) and the UE may also support receiving data on a second RAT (e.g., GNSS). In an additional aspect, the first and second RAT may be the same RAT, e.g., LTE RAT, but in different LTE bands. That is, the UE may be operating simultaneously in two LTE bands.

In an aspect, at block 320, methodology 300 may include populating the unused resources, at a medium access control (MAC) layer, with pseudo-randomized bits. For example, in an aspect, UE 202 and/or uplink transmission manager 206 may include a specially programmed processor module, or a processor executing specially programmed code stored in a memory, to populate the unused resources, at a medium access control (MAC) layer, with pseudo-randomized bits.

For example, when UE 202 and/or uplink transmission manager 206 determines that an uplink resource grant results in unused resources at the UE, UE 202 and/or uplink transmission manager 206 may populate the unused resources with pseudo-randomized bits. In an aspect, the populating of the unused resources with pseudo-randomized bits may be performed at a MAC layer of UE 202.

For instance, in an aspect, the populating of the unused resources with pseudo-randomized bits may include UE 202 and/or uplink transmission manager 206 generating a maximum length sequence (MLS) and storing the MLS in a buffer (e.g, a first buffer) at the MAC layer of the UE, performing a bit inversion of the MLS and storing an output of the bit inversion in a different buffer (e.g., second buffer) at the MAC layer, initiating a linear feedback shift register (LFSR) with a non-zero value at the MAC layer. In an additional or optional aspect, UE 202 and/or resource populating manager may copy contents of the first buffer to a MAC transmit buffer when a value of a least significant bit (LSB) of the LFSR is zero.

For example, UE 202 and/or uplink transmission manager 206 may generate a maximum length sequence (MLS) or a m-sequence which may be generally defined as a bit sequence that is periodic and can reproduce every binary sequence (except the zero vector) represented by shift registers. For example, the MLS may be a pseudorandom binary sequence and represented by coefficients of irreducible polynomials. For example, in an aspect, a polynomial X25+X23+1 which corresponds to taps=0x1000004 may be used. For instance, in an aspect, an m-sequence generator (located at UE 202 and/or uplink transmission manager 206) may be used to generate a 128 bit pseudorandom binary sequence and store the generated MLS in a buffer (e.g., first buffer) at the MAC layer of the UE. In an additional aspect, UE 202 and/or uplink transmission manager 206 may perform an inversion of the pseudorandom binary sequence stored in the first buffer and the store the output of the inversion in an another buffer (e.g., second buffer) at the MAC layer of the UE.

In an aspect, UE 202 and/or uplink transmission manager 206 may initiate a linear feedback shift register (LFSR) which is generally defined as a shift register whose input is a linear function of its previous state used for generating pseudo random sequences, and which may be implemented by software, hardware, firmware, and/or a combination.

For example, in an aspect, the input bit of the LFSR input may be driven by exclusive-or (XOR) of some bits of the overall shift register value. When the LFSR is initiated, the initial value of LFSR is called the seed, and because the operation of a register is deterministic, the stream of values produced by the register may be determined by its current (or previous) state. Additionally, as the register has a finite number of possible states, it may eventually enter a repeating cycle. However, a LFSR with a well-chosen feedback function may produce a sequence of bits which may appear random and which may have a very long cycle. For example, in an aspect, UE 202 and/or uplink transmission manager 206 may initiate a LFSR with a non-zero value.

In an aspect, UE 202 and/or uplink transmission manager 206 may determine whether a value of a least significant bit (LSB) of the LFSR is zero. For example, the LSB of LFSR is the right most bit of the LFSR. When UE 202 and/or uplink transmission manager 206 determines that the value of the LSB of the LFSR is zero, UE 202 and/or uplink transmission manager 206 may copy contents of the first buffer to a MAC transmit buffer for transmitting data from UE 202 on UL 224 to network entity 220 and/or cell 222. In an additional or optional aspect, when UE 202 and/or uplink transmission manager 206 determines that the value of the LSB of the LFSR is one, UE 202 and/or uplink transmission manager 206 may copy contents of the second buffer to the MAC transmit buffer for transmitting data from UE 202 on UL 224 to network entity 220 and/or cell 222.

In an additional or optional aspect, methodology 300 may update a state of the LFSR. For example, when UE 202 and/or uplink transmission manager 206 copies contents of the first buffer (e.g., when the value of the LSB of the LFSR is zero) to the MAC transmit buffer, the state of the LFSR may be updated by right shifting contents of the LFSR by one bit. In a further additional or optional aspect, when UE 202 and/or uplink transmission manager 206 copies contents of the second buffer to the MAC transmit buffer (e.g., when the value of the LSB of the LFSR is one), the state of the LFSR may be updated by right shifting contents of the LFSR by one bit and performing an exclusive OR (XOR) operation on an output of the updated state using connection taps. In an aspect, the connection taps may be bit positions in the LFSR that affect a next state of the LFSR.

In an additional or optional aspect, UE 202 and/or uplink transmission manager 206 may perform populating (e.g., using one or more populating bytes) of the unused resource at the end of the MAC PDU. As the padding is performed at the UE, the UE has knowledge of when the padding is performed for transmitting on the UL.

In an aspect, UE 202 and/or uplink transmission manager 206 may perform populating (e.g., using one or more populating bytes) of the unused resources when the UE is configured to operate in LTE and/or GNSS RATs. In an additional or optional aspect, UE 202 (e.g. cellular transceiver 204) may be configured to operate in LTE B13 frequency band and/or GNSS receiver 210 may be configured to operate GNSS L1 band.

In an additional aspect, UE 202 and/or uplink transmission manager 206 may perform populating (e.g., using one or more populating bytes) of the unused resources when the UE is configured to operate in LTE and GNSS receiver 210 does not co-exist with cellular transceiver 204 at UE 202. For example, GNSS receiver 210 may be in the vicinity (e.g., 1 meter) of UE 202. The resource populating as described above may reduce or eliminate multi-tone jammer produced at GNSS receiver 210.

Figure 4:
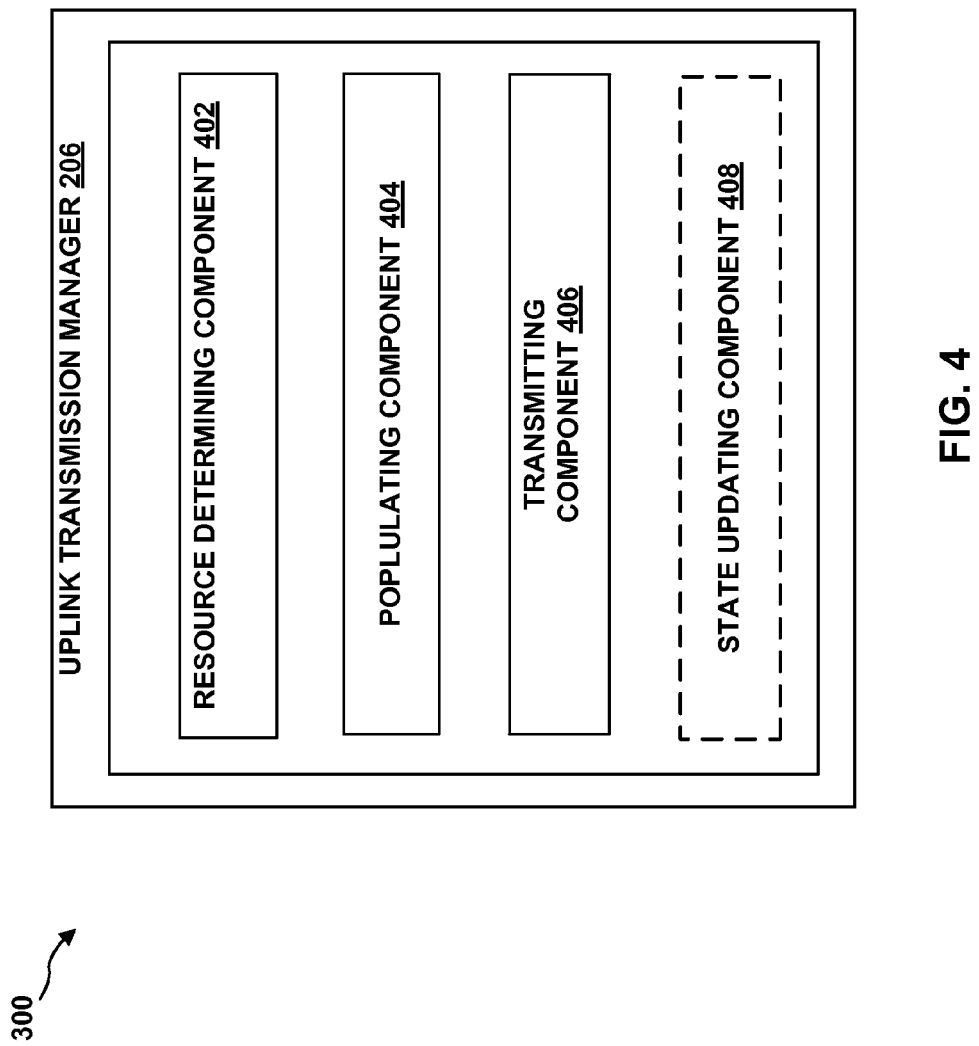
FIG. 4 is a block diagram illustrating an example uplink transmission manager in aspects of the present disclosure.

Referring to FIG. 4, illustrated are an example uplink transmission manager 206 and various sub-components for wireless communications at a user equipment (UE). In an example aspect, uplink transmission manager 206 may be configured to include the specially programmed processor module, or the processor executing specially programmed code stored in a memory, in the form of a resource determining component 402, populating component 404, a transmitting component 406, and/or a state updating component 408. In an aspect, a component may be one of the parts that make up a system, may be hardware or software, and may be divided into other components.

In an aspect, uplink transmission manager 206 and/or resource determining component 402 may be configured to determine that an uplink (UL) resource grant, associated with a first radio access technology (RAT), for the UE results in unused resources where there are a greater number of resources than available data for transmission at the UE. For example, in an aspect, resource determining component 402 may be configured to determine that an uplink (UL) resource grant associated with a first RAT (e.g., LTE) for UE 202 results in unused resources where there are a greater number of resources than available data for transmission at the UE. In an additional aspect, UE 202 may be configured to receive information associated with a second RAT as well (e.g., GNSS RAT).

In an aspect, uplink transmission manager 206 and/or populating component 404 may be configured to populate the unused resources, at a medium access control (MAC) layer, with pseudo-randomized bits. For example, in an aspect, populating component 404 may be configured to populate the unused resources at a MAC layer of UE 102 with pseudo-randomized bits (e.g., pseudo-randomized non-zero value bits).

In an aspect, uplink transmission manager 206 and/or transmitting component 406 may be configured to transmit at least a portion of the available data and the populated unused resources using the UL resource grant associated with the first RAT. For example, in an aspect, transmitting component 406 may be configured to transmit at least a portion of the available data and the populated unused resources (e.g., populated with pseudo-randomized bits) using the UL resource grant associated with the first RAT (e.g., LTE).

In an optional aspect, uplink transmission manager 206 and/or state updating component 408 may be optionally configured to update a state of the LFSR by right shifting contents of the LFSR by one or more bits. In a further optional aspect, uplink transmission manager 206 and/or state updating component 408 may be optionally configured to update a state of the LFSR by right shifting contents of the LFSR by one or more bits and perform an exclusive OR (XOR) operation on an output of the updating using connection taps, wherein the connection taps are bit positions in the LFSR.

Figure 5:
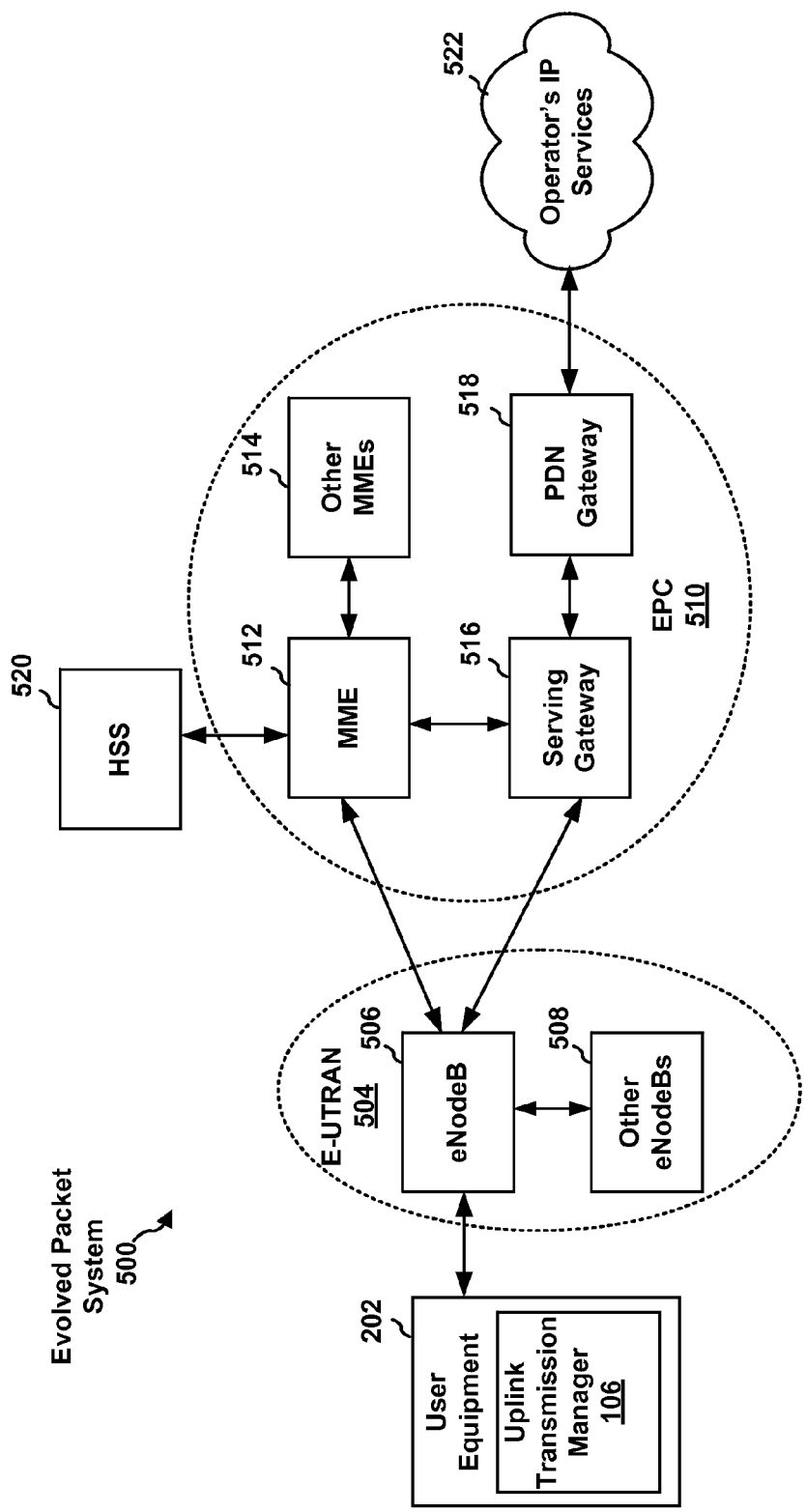
FIG. 5 is a diagram illustrating an example of a network architecture according to an aspect of the present disclosure.

FIG. 5 is a diagram illustrating LTE network architecture 500. The LTE network architecture 500 may be referred to as an Evolved Packet System (EPS). The EPS may include one or more of UE 202, which may include uplink transmission manager 206 (FIGS. 2 and 4) configured for wireless communications at UE 202. Additionally, EPS includes an Evolved UMTS Terrestrial Radio Access Network (E-UTRAN) 504, an Evolved Packet Core (EPC) 510, a Home Subscriber Server (HSS) 520, and an Operator's IP Services 522. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 506 and other eNBs 508. The eNB 506 provides user and control planes protocol terminations toward the UE 202. The eNB 506 may be connected to the other eNBs 508 via a backhaul (e.g., an X2 interface). The eNB 506 may also be referred to as a base station, a base transceiver station, a radio base station, a radio transceiver, a transceiver function, a basic service set (BSS), an extended service set (ESS), or some other suitable terminology. The eNB 506 provides an access point to the EPC 510 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 506 is connected by an S5 interface to the EPC 510. The EPC 510 includes a Mobility Management Entity (MME) 512, other MMEs 514, a Serving Gateway 516, and a Packet Data Network (PDN) Gateway 518. The MME 512 is the control node that processes the signaling between the UE 202 and the EPC 510. Generally, the MME 512 provides bearer and connection management. All user IP packets are transferred through the Serving Gateway 516, which itself is connected to the PDN Gateway 518. The PDN Gateway 518 provides UE IP address allocation as well as other functions. The PDN Gateway 518 is connected to the Operator's IP Services 522. The Operator's IP Services 522 may include the Internet, the Intranet, an IP Multimedia Subsystem (IMS), and a PS Streaming Service (PSS).

Figure 6:
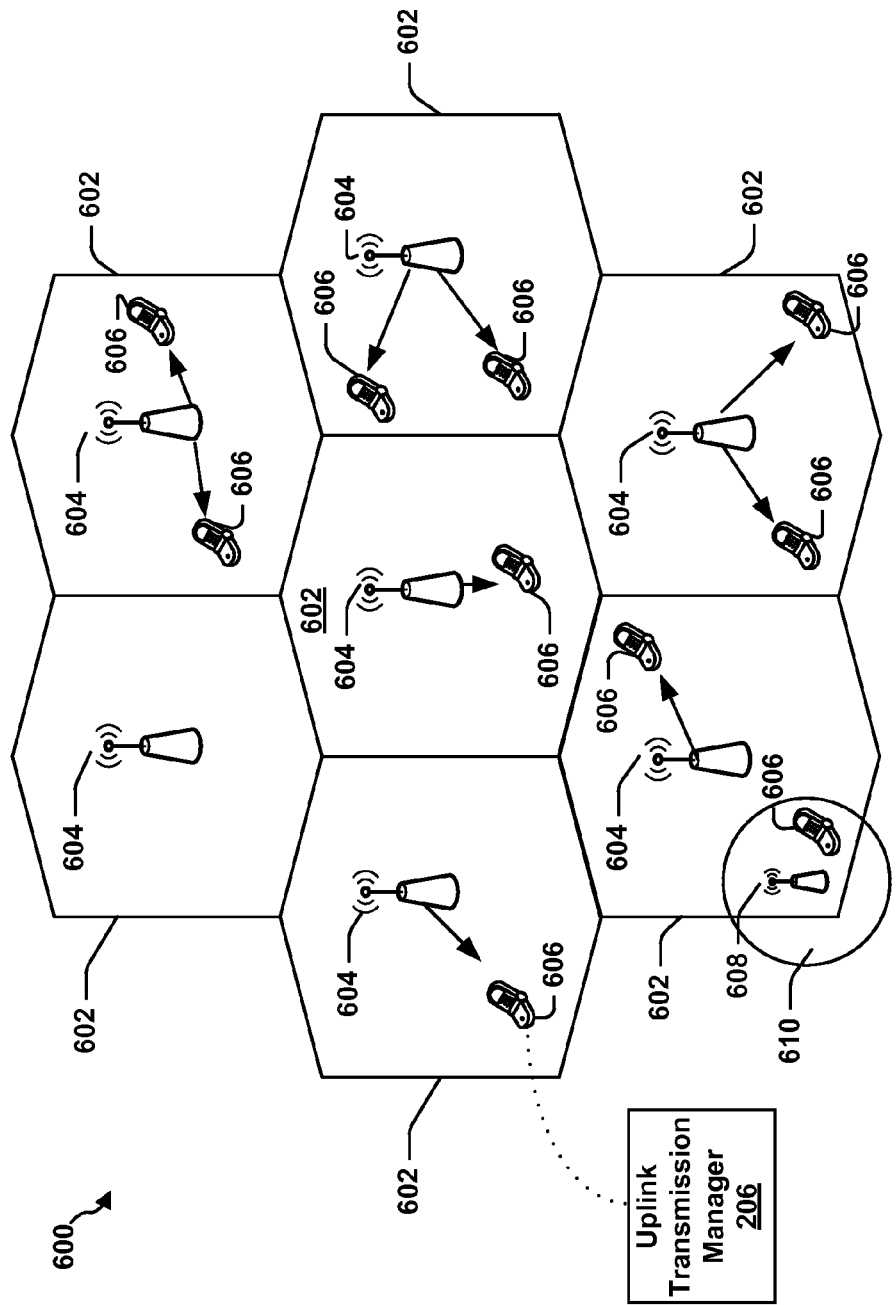
FIG. 6 is a diagram illustrating an example of an access network in according to an aspect of the present disclosure.

FIG. 6 is a diagram illustrating an example of an access network 600 in an LTE network architecture in which one or more UEs 606 may each include uplink transmission manager (FIGS. 2 and 4), as discussed herein. In an aspect, UE 606 may be the same or similar to UE 202 and/or cell 602 may be the same or similar to cell 222. In this example, the access network 600 is divided into a number of cellular regions (cells) 602. One or more lower power class eNBs 608 may have cellular regions 610 that overlap with one or more of the cells 602. The lower power class eNB 608 may be a femto cell (e.g., home eNB (HeNB)), pico cell, micro cell, or remote radio head (RRH). The macro eNBs 604 are each assigned to a respective cell 602 and are configured to provide an access point to the EPC 510 for all the UEs 606 in the cells 602. There is no centralized controller in this example of an access network 600, but a centralized controller may be used in alternative configurations. The eNBs 604 are responsible for all radio related functions including radio bearer control, admission control, mobility control, scheduling, security, and connectivity to the serving gateway 516.

The modulation and multiple access scheme employed by the access network 600 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations.

These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 604 may have multiple antennas supporting MIMO technology. The use of MIMO technology enables the eNBs 604 to exploit the spatial domain to support spatial multiplexing, beamforming, and transmit diversity. Spatial multiplexing may be used to transmit different streams of data simultaneously on the same frequency. The data steams may be transmitted to a single UE 606 to increase the data rate or multiple UEs 606 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 606 with different spatial signatures, which enables each of the UE(s) 606 to recover the one or more data streams destined for that UE 606. On the UL, each UE 606 transmits a spatially precoded data stream, which enables the eNB 604 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 7:
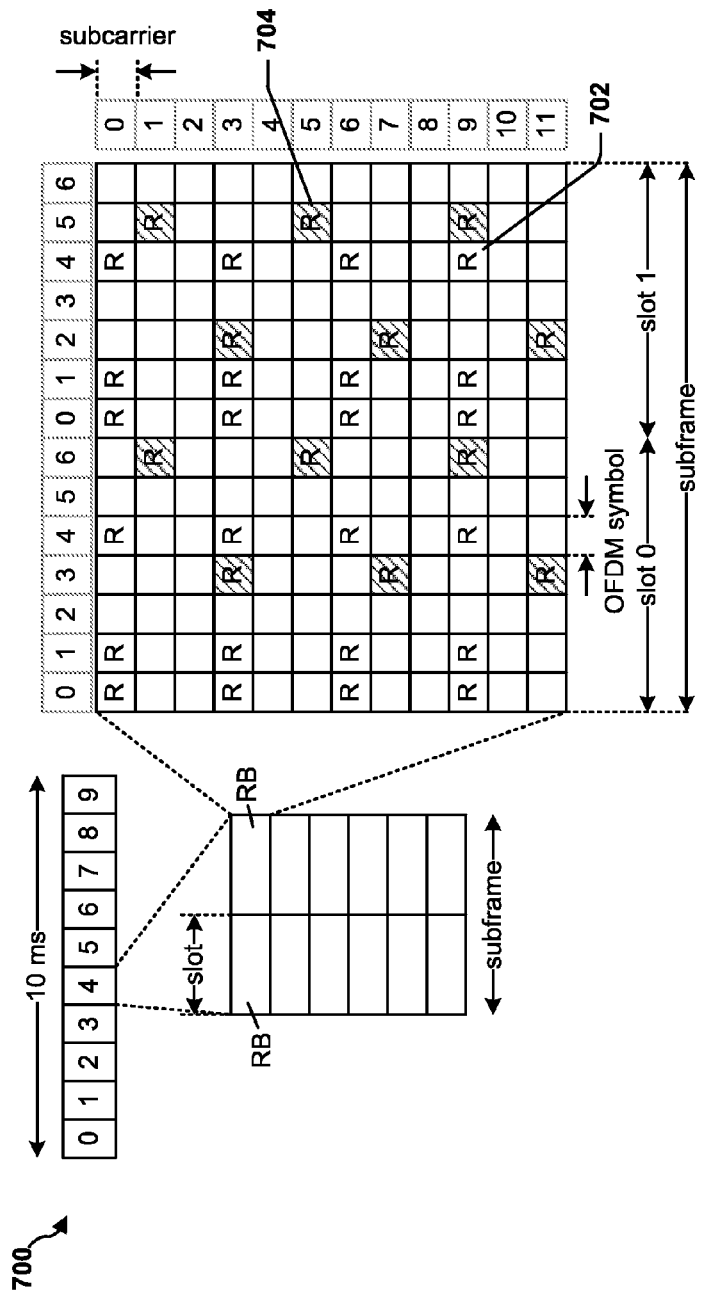
FIG. 7 is a diagram illustrating an example of a DL frame structure in LTE in accordance with an aspect of the present disclosure.

FIG. 7 is a diagram 700 illustrating an example of a DL frame structure in LTE, which may be received by a UE, such as UE 202 (FIG. 2). A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 702, 704, include DL reference signals (DL-RS). The DL-RS include Cell-specific RS (CRS) (also sometimes called common RS) 702 and UE-specific RS (UE-RS) 704. UE-RS 704 are transmitted only on the resource blocks upon which the corresponding physical DL shared channel (PDSCH) is mapped. The number of bits carried by each resource element depends on the modulation scheme. Thus, the more resource blocks that a UE, such UE 202 of FIG. 2 including uplink transmission manager 206, receives and the higher the modulation scheme, the higher the data rate for the UE.

Figure 8:
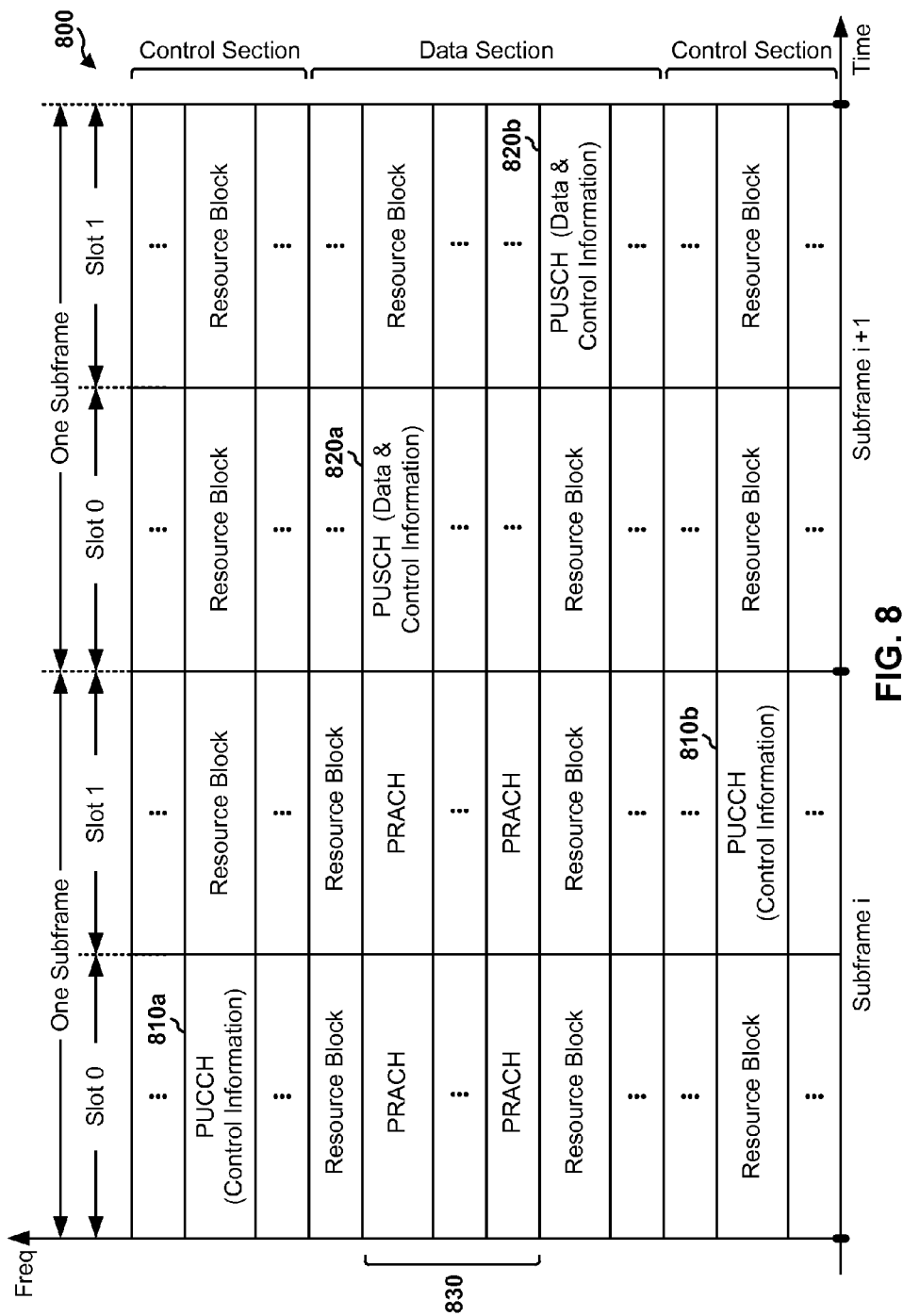
FIG. 8 is a diagram illustrating an example of an UL frame structure in LTE in accordance with an aspect of the present disclosure.

FIG. 8 is a diagram 800 illustrating an example of an UL frame structure in LTE, which may be transmitted by a UE, such as UE 202 (FIG. 2) that may include uplink transmission manager 206 (FIGS. 2 and 4), as described herein. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE, such as UE 202 (FIG. 2) including uplink transmission manager 106, may be assigned resource blocks 810a, 810b in the control section to transmit control information to an eNB. The UE may also be assigned resource blocks 820a, 820b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 830. The PRACH 830 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 9:
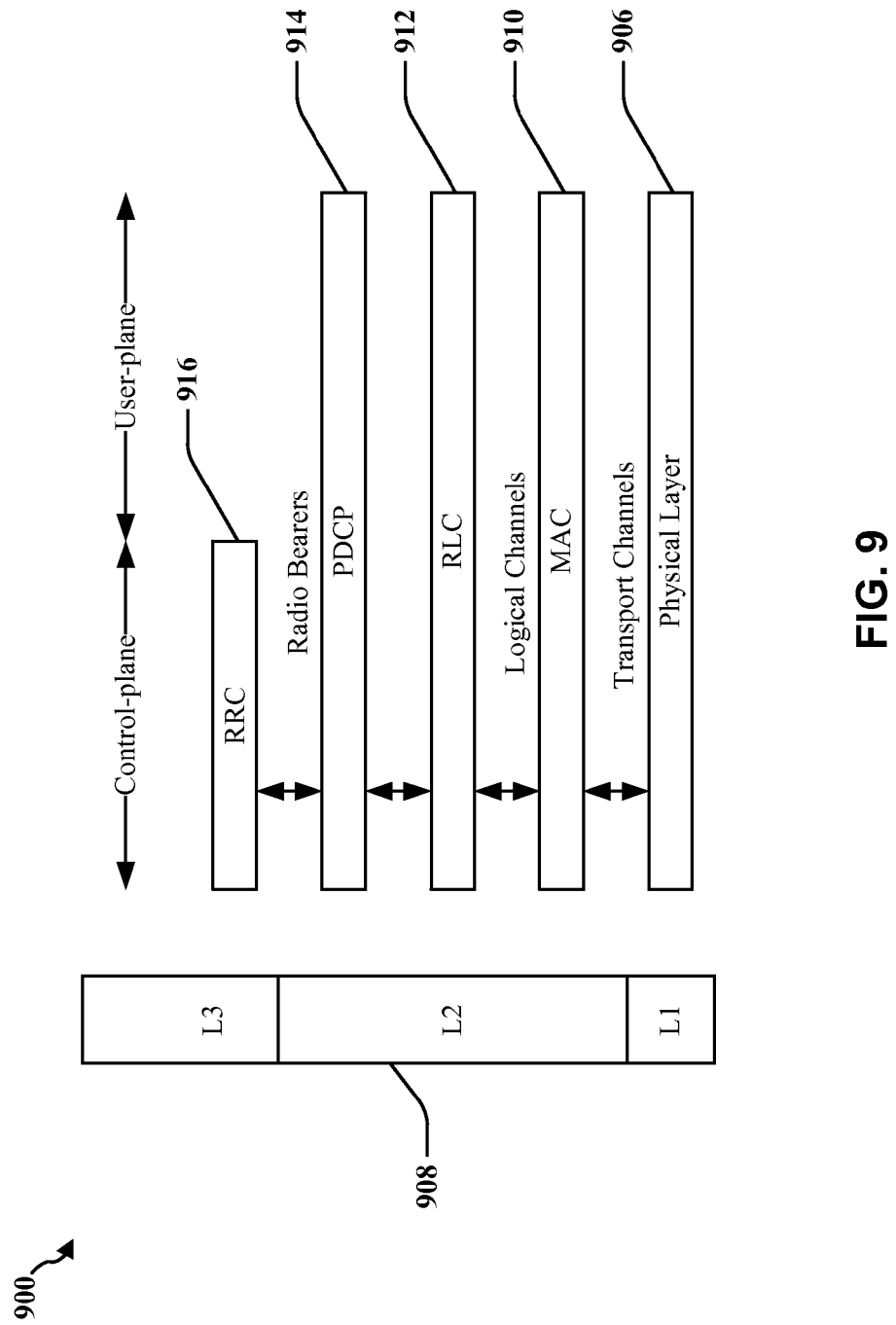
FIG. 9 is a diagram illustrating an example of a radio protocol architecture for the user and control planes in accordance with an aspect of the present disclosure.

FIG. 9 is a diagram 900 illustrating an example of a radio protocol architecture for the user and control planes in LTE. The radio protocol architecture may be used by a UE, such UE 202 (FIG. 2), uplink transmission manager 206, and an eNB, and the radio architecture includes three layers: Layer 1, Layer 2, and Layer 3. Layer 1 (L1 layer) is the lowest layer and implements various physical layer signal processing functions. The L1 layer will be referred to herein as the physical layer 906. Layer 2 (L2 layer) 908 is above the physical layer 906 and is responsible for the link between the UE and eNB over the physical layer 906.

In the user plane, the L2 layer 908 includes a media access control (MAC) sublayer 910, a radio link control (RLC) sublayer 912, and a packet data convergence protocol (PDCP) 914 sublayer, which are terminated at the eNB on the network side. Although not shown, the UE may have several upper layers above the L2 layer 908 including a network layer (e.g., IP layer) that is terminated at the PDN gateway 518 on the network side, and an application layer that is terminated at the other end of the connection (e.g., far end UE, server, etc.).

The PDCP sublayer 914 provides multiplexing between different radio bearers and logical channels. The PDCP sublayer 914 also provides header compression for upper layer data packets to reduce radio transmission overhead, security by ciphering the data packets, and handover support for UEs between eNBs. The RLC sublayer 912 provides segmentation and reassembly of upper layer data packets, retransmission of lost data packets, and reordering of data packets to compensate for out-of-order reception due to hybrid automatic repeat request (HARQ). The MAC sublayer 910 provides multiplexing between logical and transport channels. The MAC sublayer 910 is also responsible for allocating the various radio resources (e.g., resource blocks) in one cell among the UEs. The MAC sublayer 910 is also responsible for HARQ operations.

In the control plane, the radio protocol architecture for the UE and eNB is substantially the same for the physical layer 906 and the L2 layer 908 with the exception that there is no header compression function for the control plane. The control plane also includes a radio resource control (RRC) sublayer 916 in Layer 3 (L3 layer). The RRC sublayer 916 is responsible for obtaining radio resources (i.e., radio bearers) and for configuring the lower layers using RRC signaling between the eNB and the UE.

Figure 10:
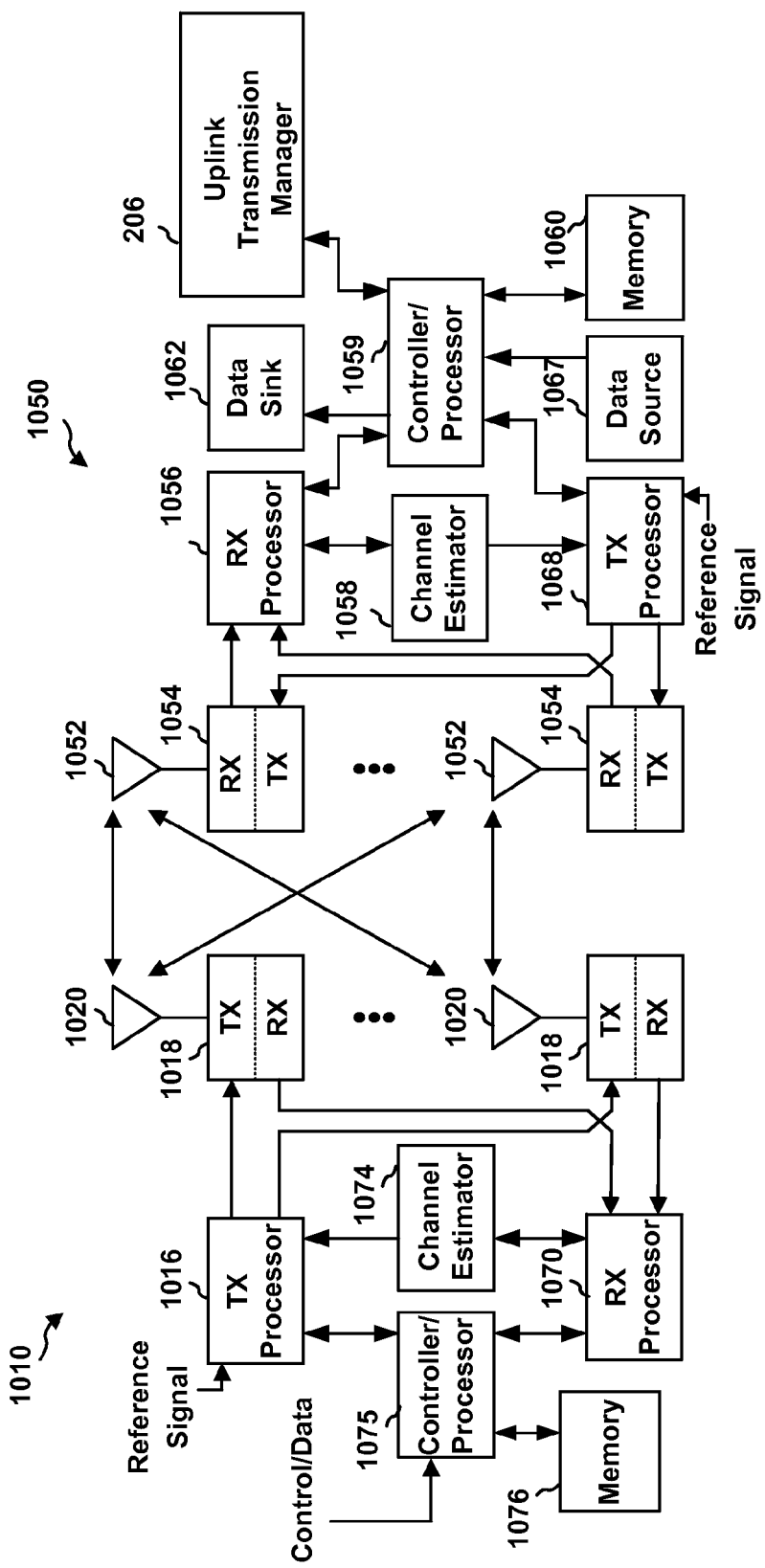
FIG. 10 is a diagram illustrating an example of an evolved Node B and user equipment in an access network in accordance with an aspect of the present disclosure.

FIG. 10 is a block diagram of an eNB 1010 in communication with a UE 1050 in an access network. UE 1050 may be the same or similar as UE 202 including uplink transmission manager 206 of FIG. 2. In the DL, upper layer packets from the core network are provided to a controller/processor 1075. The controller/processor 1075 implements the functionality of the L2 layer. In the DL, the controller/processor 1075 provides header compression, ciphering, packet segmentation and reordering, multiplexing between logical and transport channels, and radio resource allocations to the UE 1050 based on various priority metrics. The controller/processor 1075 is also responsible for HARQ operations, retransmission of lost packets, and signaling to the UE 1050.

The transmit (TX) processor 1016 implements various signal processing functions for the L1 layer (i.e., physical layer). The signal processing functions includes coding and interleaving to facilitate forward error correction (FEC) at the UE 1050 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1074 may be used to determine the coding and modulation scheme, as well as for spatial processing. The channel estimate may be derived from a reference signal and/or channel condition feedback transmitted by the UE 1050. Each spatial stream is then provided to a different antenna 1020 via a separate transmitter 1018TX. Each transmitter 1018TX modulates an RF carrier with a respective spatial stream for transmission.

At the UE 1050, each receiver 1054RX receives a signal through its respective antenna 1052. Each receiver 1054RX recovers information modulated onto an RF carrier and provides the information to the receive (RX) processor 1056. The RX processor 1056 implements various signal processing functions of the L1 layer. The RX processor 1056 performs spatial processing on the information to recover any spatial streams destined for the UE 1050. If multiple spatial streams are destined for the UE 1050, they may be combined by the RX processor 1056 into a single OFDM symbol stream.

The RX processor 1056 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 1010. These soft decisions may be based on channel estimates computed by the channel estimator 1058. The soft decisions are then decoded and deinterleaved to recover the data and control signals that were originally transmitted by the eNB 1010 on the physical channel. The data and control signals are then provided to the controller/processor 1059.

The controller/processor 1059 implements the L2 layer. The controller/processor can be associated with a memory 1060 that stores program codes and data. The memory 1060 may be referred to as a computer-readable medium. In the UL, the controller/processor 1059 provides demultiplexing between transport and logical channels, packet reassembly, deciphering, header decompression, control signal processing to recover upper layer packets from the core network. The upper layer packets are then provided to a data sink 1062, which represents all the protocol layers above the L2 layer. Various control signals may also be provided to the data sink 1062 for L3 processing. The controller/processor 1059 is also responsible for error detection using an acknowledgement (ACK) and/or negative acknowledgement (NACK) protocol to support HARQ operations.

In the UL, a data source 1067 is used to provide upper layer packets to the controller/processor 1059. The data source 1067 represents all protocol layers above the L2 layer. Similar to the functionality described in connection with the DL transmission by the eNB 1010, the controller/processor 1059 implements the L2 layer for the user plane and the control plane by providing header compression, ciphering, packet segmentation and reordering, and multiplexing between logical and transport channels based on radio resource allocations by the eNB 1010. The controller/processor 1059 is also responsible for HARQ operations, retransmission of lost packets, and signaling to the eNB 1010.

Channel estimates derived by a channel estimator 1058 from a reference signal or feedback transmitted by the eNB 1010 may be used by the TX processor 1068 to select the appropriate coding and modulation schemes, and to facilitate spatial processing. The spatial streams generated by the TX processor 1068 are provided to different antenna 1052 via separate transmitters 1054TX. Each transmitter 1054TX modulates an RF carrier with a respective spatial stream for transmission.

The UL transmission is processed at the eNB 1010 in a manner similar to that described in connection with the receiver function at the UE 1050. Each receiver 1018RX receives a signal through its respective antenna 1020. Each receiver 1018RX recovers information modulated onto an RF carrier and provides the information to a RX processor 1070. The RX processor 1070 may implement the L1 layer.

The controller/processor 1075 implements the L2 layer. The controller/processor 1075 can be associated with a memory 1076 that stores program codes and data. The memory 1076 may be referred to as a computer-readable medium. In the UL, the controller/processor 1075 provides demultiplexing between transport and logical channels, packet reassembly, deciphering, header decompression, control signal processing to recover upper layer packets from the UE 1050. Upper layer packets from the controller/processor 1075 may be provided to the core network. The controller/processor 1075 is also responsible for error detection using an ACK and/or NACK protocol to support HARQ operations.

Figure 11:
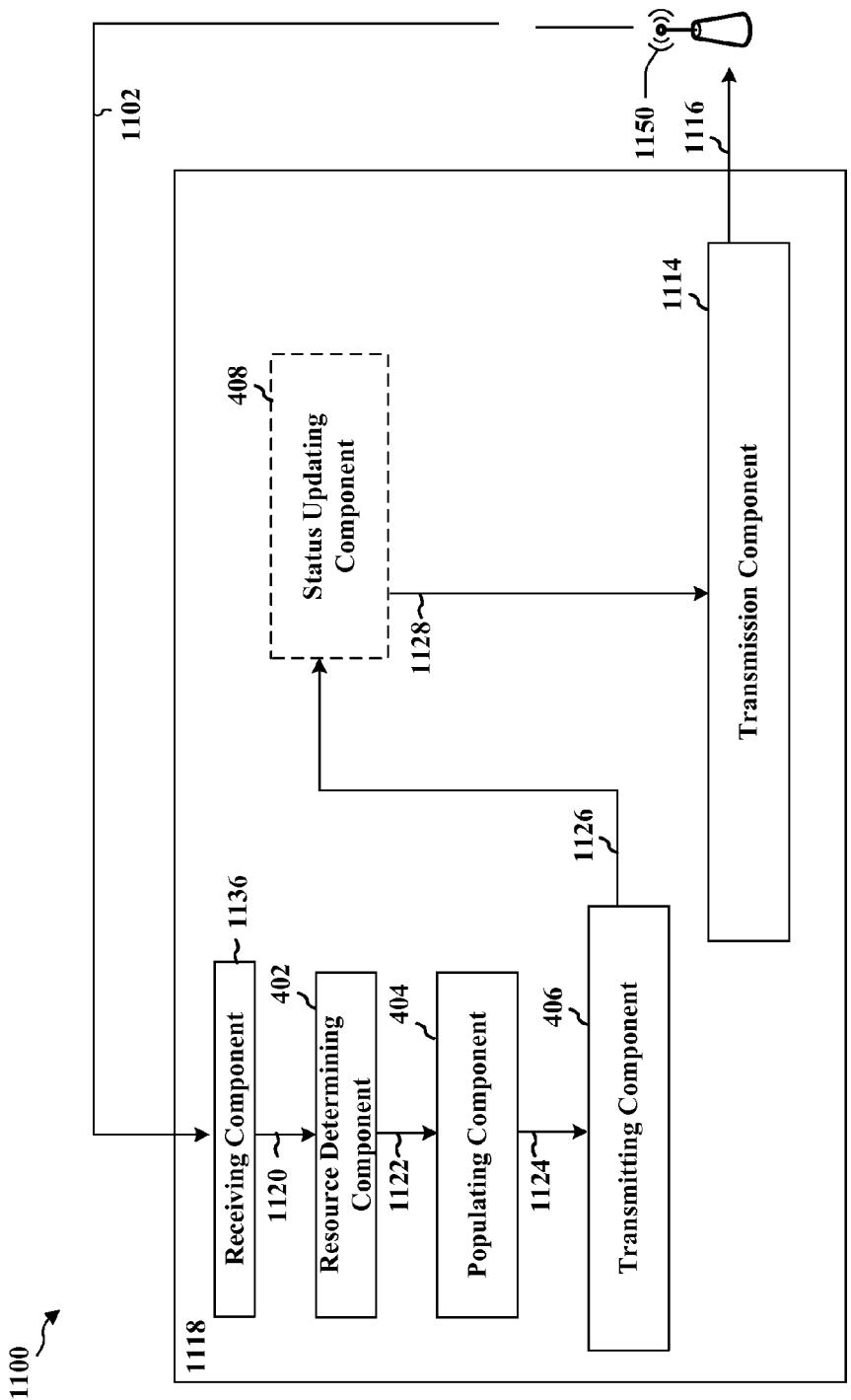
FIG. 11 is a conceptual data flow diagram illustrating the data flow between different modules/means/components in an example apparatus according to an aspect of the present disclosure.

Referring to FIG. 11, data flow 1100 illustrates an example flow between different modules/means/components in an example apparatus 1118 according to an aspect of the present disclosure. The apparatus may be a UE, such as UE 202 including uplink transmission manager 206 of FIG. 2. Apparatus 1118 includes receiving component 1136 for receiving wireless information 1102 from base station 1150 (e.g., cell 222). Further, apparatus 1118 includes a resource determining component 402 for determining that an uplink (UL) resource grant, associated with a first radio access technology (RAT), for the UE results in unused resources where there are a greater number of resources than available data for transmission at the UE. Further, apparatus 1118 may include a populating component 404 for populating unused resources 1122, at a medium access control (MAC) layer, with pseudo-randomized bits. In an aspect, cellular transceiver 204 could be a part of receiving component 1136.

Additionally, apparatus 1118 may include transmitting component 406 for transmitting at least a portion of the available data and populated unused resources 1124 using the UL resource grant associated with the first RAT. In a further aspect, state updating component 408 may receive populated unused resources 1126 to update a state of the LFSR state by right shifting contents of the LFSR by one or more bits. Moreover, transmission component 1114 may send/transmit one or more communications 1116 in the form of pseudo-randomized bits to one or more network entities, including network entity 220 and/or cell 222.

The apparatus may include additional modules that perform each of the steps of the algorithm in the aforementioned flow diagram of FIG. 3. As such, each step in the aforementioned flow diagram of FIG. 3 may be performed by a module or a component and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
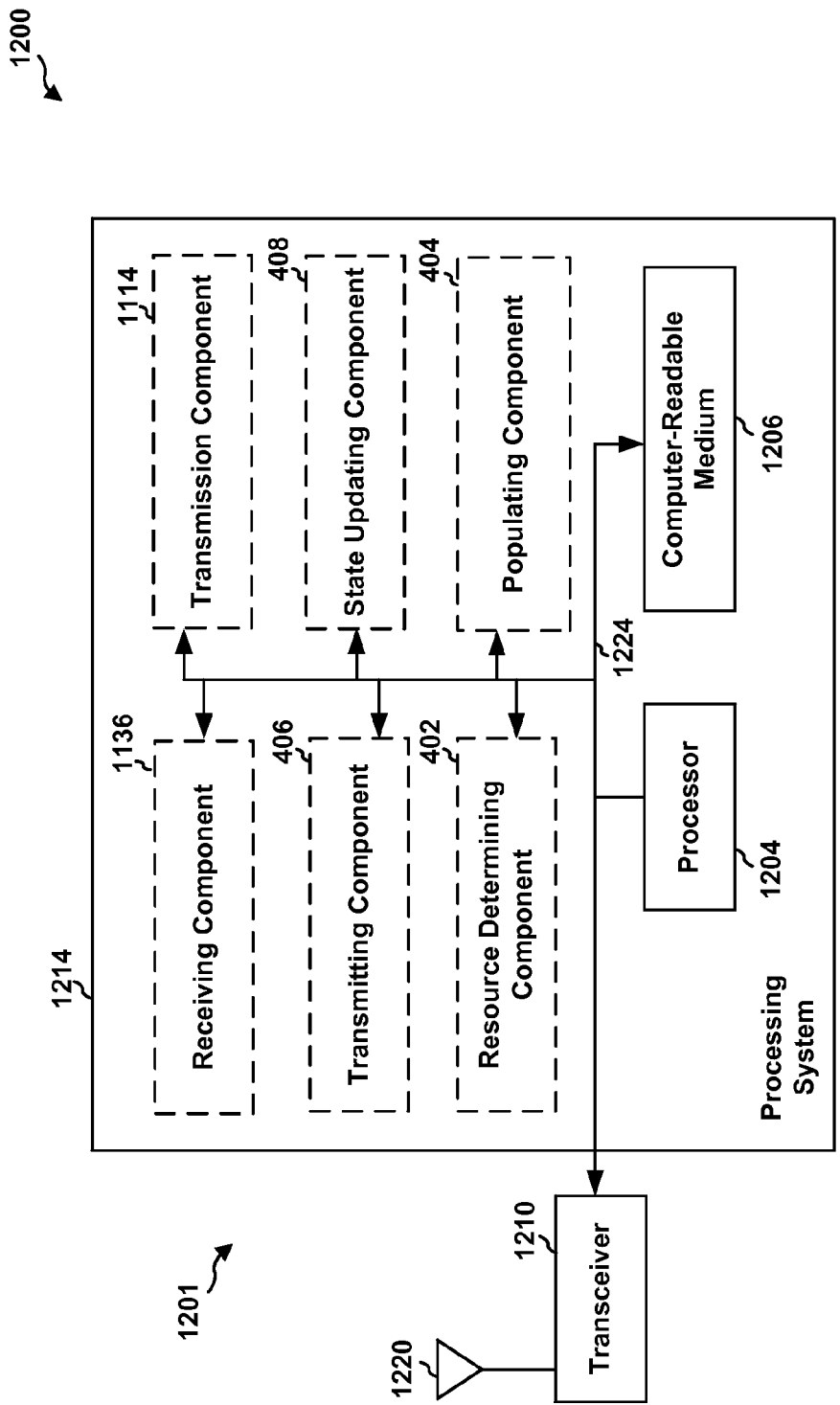
FIG. 12 is a diagram illustrating an example of a hardware implementation for an apparatus employing a processing system according to an aspect of the present disclosure.

FIG. 12 is a diagram 1200 illustrating an example of a hardware implementation for an apparatus 1201 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by processor 1204, components 402, 404, 406, 408, 1136, 1114, and computer-readable medium 1206. The bus 1224 may also link various other circuits such as timing sources, peripherals, voltage regulators, and power management circuits, which are well known in the art, and therefore, will not be described any further. In an aspect, cellular transceiver 204 and/or GNSS receiver 210 could be a part of transceiver 1210.

The processing system 1214 may be coupled to a transceiver 1210. The transceiver 1210 is coupled to one or more antennas 1220. The transceiver 1210 provides a means for communicating with various other apparatus over a transmission medium. The processing system 1214 includes a processor 1204 coupled to a computer-readable medium 1206. The processor 1204 is responsible for general processing, including the execution of software stored on the computer-readable medium 1206. The software, when executed by the processor 1204, causes the processing system 1214 to perform the various functions described supra for any particular apparatus. The computer-readable medium 1206 may also be used for storing data that is manipulated by the processor 1204 when executing software.

The processing system further includes at least one of components 402, 404, 406, 408, 1136, and/or 1114. The components may be software modules running in the processor 1204, resident/stored in the computer-readable medium 1206, one or more hardware modules coupled to the processor 1204, or some combination thereof. The processing system 1214 may be a component of the UE 1050 (FIG. 10) and may include the memory 1060 and/or at least one of the TX processor 1068, the RX processor 1056, and the controller/processor 1059. In other aspects, the processing system 1214 may be a component of the UE 1050 (FIG. 10) including uplink transmission manager 206.

It is understood that the specific order or hierarchy of steps in the processes disclosed is an illustration of example approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications, by a user equipment (UE), comprising:
    determining that an uplink (UL) resource grant, associated with a first radio access technology (RAT), for the UE results in unused resources where there are a greater number of resources than available data for transmission at the UE, wherein the UE is configured to receive information associated with a second RAT, and wherein the first RAT is different from the second RAT;
    populating the unused resources, at a medium access control (MAC) layer, with pseudo-randomized bits by:
        generating a maximum length sequence (MLS) and storing the MLS in a first buffer at the MAC layer,
        performing a bit inversion of the MLS and storing an output of the bit inversion in a second buffer at the MAC layer,
        initiating a linear feedback shift register (LFSR) with a non-zero value at the MAC layer, and
        copying contents of the first buffer to a MAC transmit buffer when a value of a least significant bit (LSB) of the LFSR is zero and contents of the second buffer to the MAC transmit buffer when the value of the LSB of the LFSR is one to produce sequences of pseudorandom bits within the MAC transmit buffer; and
    transmitting at least a portion of the available data and the unused resources populated with the contents of the MAC transmit buffer using the UL resource grant associated with the first RAT.

2. The method of claim 1, further comprising:
    updating a state of the LFSR by right shifting contents of the LFSR by one or more bits.

3. The method of claim 1, further comprising:
    copying contents of the second buffer to the MAC transmit buffer when the value of the LSB of the LFSR is one.

4. The method of claim 3, wherein the populating further comprises:
    updating a state of the LFSR by right shifting contents of the LFSR by one or more bits; and
    performing an exclusive OR (XOR) operation on an output of the updating using connection taps, wherein the connection taps are bit positions in the LFSR.

5. The method of claim 1, wherein the first RAT is long term evolution (LTE) RAT and the second RAT is associated with a global navigation satellite system (GNSS) RAT.

6. The method of claim 5, wherein the first RAT is operating in LTE band number 13 and the second RAT is operating in GNSS L1 band.

7. An apparatus for wireless communications, by a user equipment (UE), comprising:
    means for determining that an uplink (UL) resource grant, associated with a first radio access technology (RAT), for the UE results in unused resources where there are a greater number of resources than available data for transmission at the UE, wherein the UE is configured to receive information associated with a second RAT, and wherein the first RAT is different from the second RAT;
    means for populating the unused resources, at a medium access control (MAC) layer, with pseudo-randomized bits including:
        means for generating a maximum length sequence (MLS) and storing the MLS in a first buffer at the MAC layer,
        means for performing a bit inversion of the MLS and storing an output of the bit inversion in a second buffer at the MAC layer,
        means for initiating a linear feedback shift register (LFSR) with a non-zero value at the MAC layer, and
        means for copying contents of the first buffer to a MAC transmit buffer when a value of a least significant bit (LSB) of the LFSR is zero and contents of the second buffer to the MAC transmit buffer when the value of the LSB of the LFSR is one to produce sequences of pseudorandom bits within the MAC transmit buffer; and
    means for transmitting at least a portion of the available data and the unused resources populated with the contents of the MAC transmit buffer using the UL resource grant associated with the first RAT.

8. The apparatus of claim 7, further comprising:
    means for updating a state of the LFSR by right shifting contents of the LFSR by one or more bits.

9. The apparatus of claim 7, further comprising:
    means for copying contents of the second buffer to the MAC transmit buffer when the value of the LSB of the LFSR is one.

10. The apparatus of claim 9, wherein the means for populating further comprises:
    means for updating a state of the LFSR by right shifting contents of the LFSR by one or more bits; and
    means for performing an exclusive OR (XOR) operation on an output of the updating using connection taps, wherein the connection taps are bit positions in the LFSR.

11. The apparatus of claim 7, wherein the first RAT is long term evolution (LTE) RAT and the second RAT is associated with a global navigation satellite system (GNSS) RAT.

12. The apparatus of claim 11, wherein the first RAT is operating in LTE band number 13 and the second RAT is operating in GNSS L1 band.

13. A non-transitory computer-readable medium storing code executable by a processor for wireless communications at a user equipment (UE), comprising:
    code for determining that an uplink (UL) resource grant, associated with a first radio access technology (RAT), for the UE results in unused resources where there are a greater number of resources than available data for transmission at the UE, wherein the UE is configured to receive information associated with a second RAT, and wherein the first RAT is different from the second RAT;

code for populating the unused resources, at a medium access control (MAC) layer, with pseudo-randomized bits including:
  code for generating a maximum length sequence (MLS) and storing the MLS in a first buffer at the MAC layer,
  code for performing a bit inversion of the MLS and storing an output of the bit inversion in a second buffer at the MAC layer,
  code for initiating a linear feedback shift register (LFSR) with a non-zero value at the MAC layer, and
  copying contents of the first buffer to a MAC transmit buffer when a value of a least significant bit (LSB) of the LFSR is zero and contents of the second buffer to the MAC transmit buffer when the value of the LSB of the LFSR is one to produce sequences of pseudorandom bits within the MAC transmit buffer; and
code for transmitting at least a portion of the available data and the unused resources populated with the contents of the MAC transmit buffer using the UL resource grant associated with the first RAT.

14. The computer-readable medium of claim 13, further comprising:
  code for updating a state of the LFSR by right shifting contents of the LFSR by one or more bits.

15. The computer-readable medium of claim 13, further comprising:
  code for copying contents of the second buffer to the MAC transmit buffer when the value of the LSB of the LFSR is one.

16. The computer-readable medium of claim 15, wherein the code for populating further comprises:
  code for updating a state of the LFSR by right shifting contents of the LFSR by one or more bits; and
code for performing an exclusive OR (XOR) operation on an output of the updating using connection taps, wherein the connection taps are bit positions in the LFSR.

17. The computer-readable medium of claim 13, wherein the first RAT is long term evolution (LTE) RAT and the second RAT is associated with a global navigation satellite system (GNSS) RAT.

18. The computer-readable medium of claim 17, wherein the first RAT is operating in LTE band number 13 and the second RAT is operating in GNSS L1 band.

19. A user equipment for wireless communications, comprising:
  a memory; and
  at least one processor coupled to the memory and configured to:
    determine that an uplink (UL) resource grant, associated with a first radio access technology (RAT), for the UE results in unused resources where there are a greater number of resources than available data for transmission at the UE, wherein the UE is configured to receive information associated with a second RAT, and wherein the first RAT is different from the second RAT;
    populate the unused resources, at a medium access control (MAC) layer, with pseudo-randomized bits by:
      generating a maximum length sequence (MLS) and storing the MLS in a first buffer at the MAC layer,
      performing a bit inversion of the MLS and storing an output of the bit inversion in a second buffer at the MAC layer,
      initiating a linear feedback shift register (LFSR) with a non-zero value at the MAC layer, and
      copying contents of the first buffer to a MAC transmit buffer when a value of a least significant bit (LSB) of the LFSR is zero and contents of the second buffer to the MAC transmit buffer when the value of the LSB of the LFSR is one to produce sequences of pseudorandom bits within the MAC transmit buffer; and
    transmit at least a portion of the available data and the unused resources populated with the contents of the MAC transmit buffer using the UL resource grant associated with the first RAT.

20. The apparatus of claim 19, wherein the at least one processor is further configured to:
  a state updating component to update a state of the LFSR by right shifting contents of the LFSR by one or more bits.

21. The apparatus of claim 19, wherein the at least one processor is further configured to copy contents of the second buffer to the MAC transmit buffer when the value of the LSB of the LFSR is one.

22. The apparatus of claim 21, wherein the at least one processor is further configured to:
  update a state of the LFSR by right shifting contents of the LFSR by one or more bits; and
  perform an exclusive OR (XOR) operation on an output of the updating using connection taps, wherein the connection taps are bit positions in the LFSR.

23. The apparatus of claim 19, wherein the first RAT is long term evolution (LTE) RAT and the second RAT is associated with a global navigation satellite system (GNSS) RAT.

24. The apparatus of claim 23, wherein the first RAT is operating in LTE band number 13 and the second RAT is operating in GNSS L1 band.

* * * * *